Figure 1:
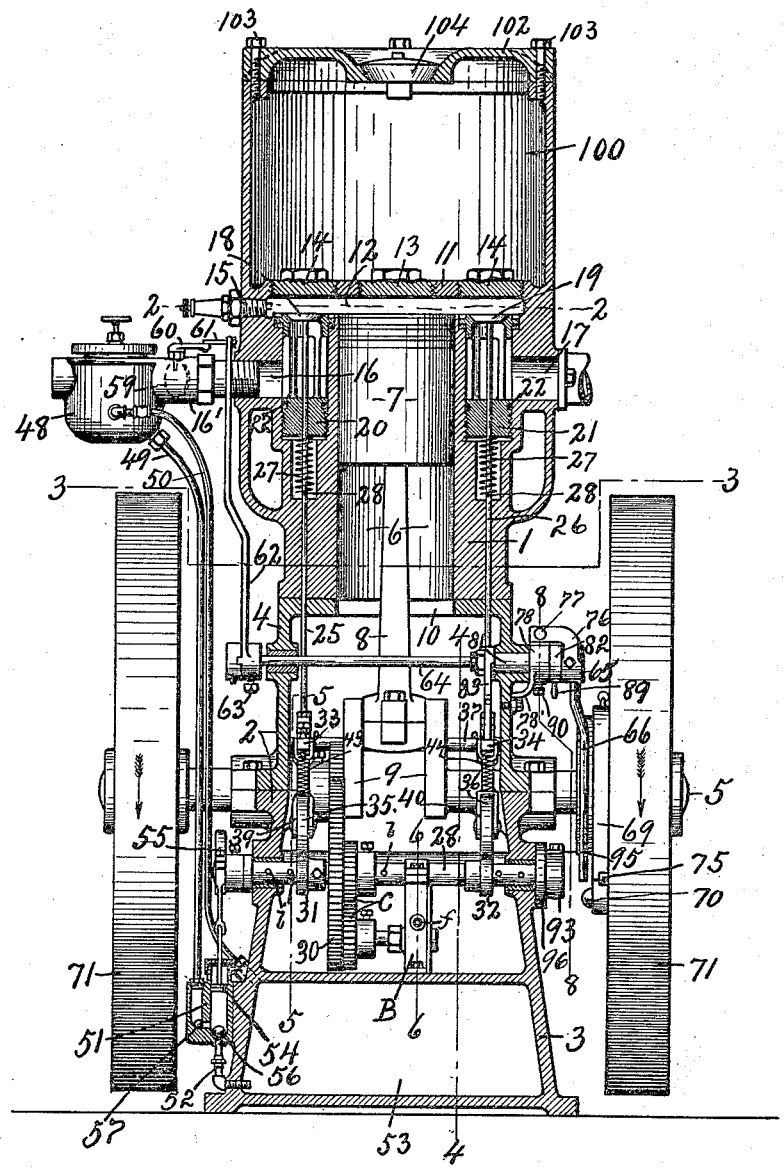

R. J. BALZ.
INTERNAL COMBUSTION ENGINE.
APPLICATION FILED APR. 9, 1914.

1,154,958.

Patented Sept. 28, 1915.
4 SHEETS—SHEET 1.

WITNESSES:

INVENTOR.
BY
ATTORNEY.

R. J. BALZ.
INTERNAL COMBUSTION ENGINE.
APPLICATION FILED APR. 9, 1914.
1,154,958.
Patented Sept. 28, 1915.
4 SHEETS—SHEET 2.
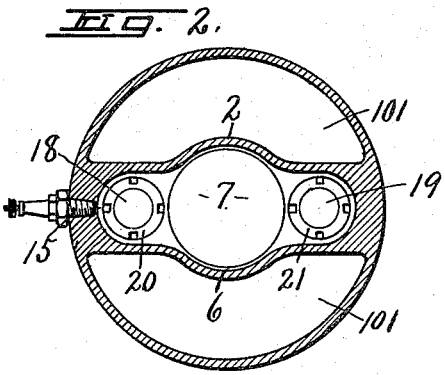
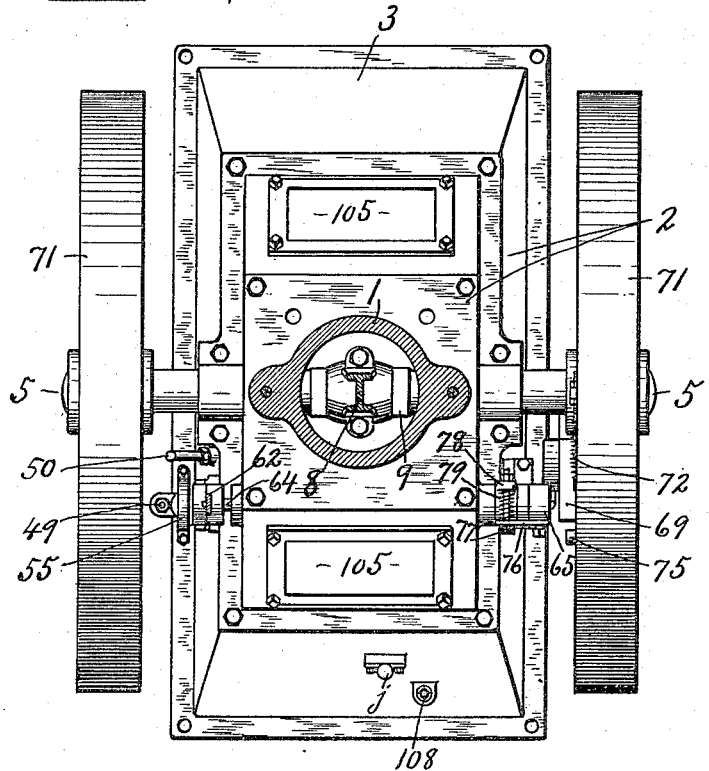
WITNESSES:
INVENTOR.
BY
ATTORNEY.

R. J. BALZ.
INTERNAL COMBUSTION ENGINE.
APPLICATION FILED APR. 9, 1914.
1,154,958.
Patented Sept. 28, 1915.
4 SHEETS—SHEET 3.
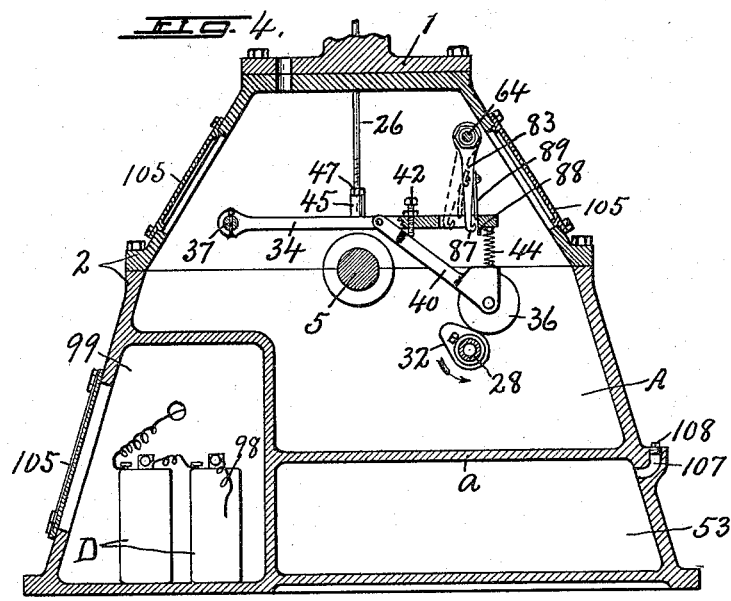
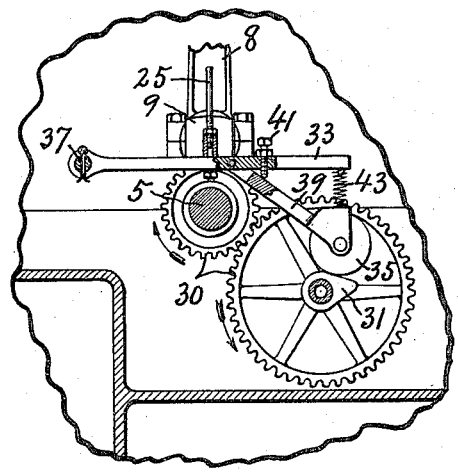
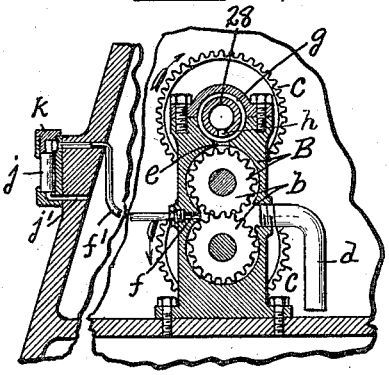
WITNESSES:
Robt. J. Balz INVENTOR.
BY Howard P. Denison ATTORNEY.

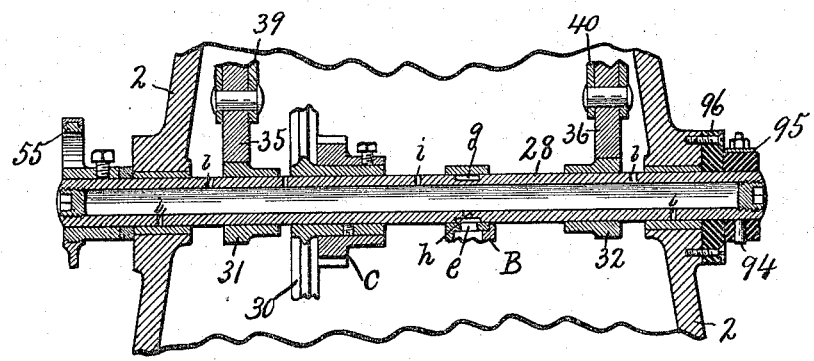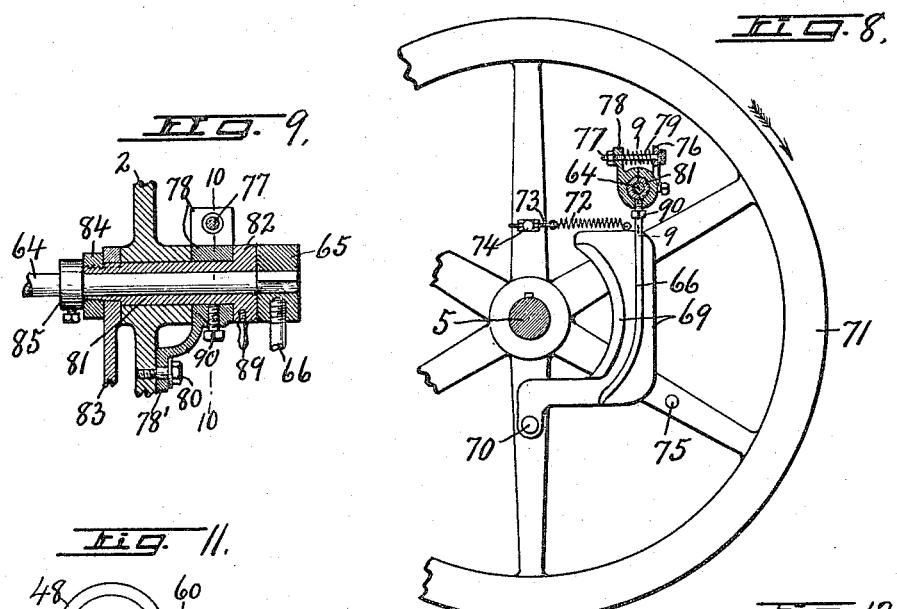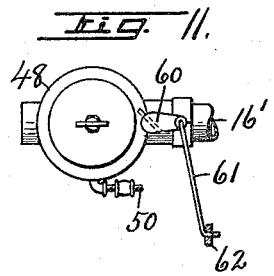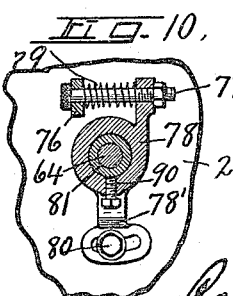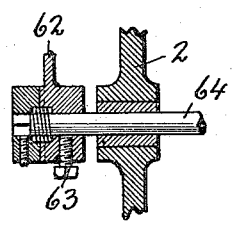

UNITED STATES PATENT OFFICE.

ROBERT J. BALZ, OF SYRACUSE, NEW YORK, ASSIGNOR OF ONE-HALF TO GERTRUDE C. MEYER, OF SYRACUSE, NEW YORK.

INTERNAL-COMBUSTION ENGINE.

1,154,958.  Specification of Letters Patent.  Patented Sept. 28, 1915.

Application filed April 9, 1914. Serial No. 830,610.

*To all whom it may concern:*

Be it known that I, ROBERT J. BALZ, of Syracuse, in the county of Onondaga, in the State of New York, have invented new and useful Improvements in Internal-Combustion Engines, of which the following, taken in connection with the accompanying drawings, is a full, clear, and exact description.

This invention relates to certain improvements in internal combustion engines and refers more particularly to the four-cycle stationary type involving the use of a reciprocatory piston and a crank shaft connected thereto by a pitman and provided with symmetrically disposed balance wheels for steadying the action of the engine.

The main object is to provide an engine of this type which is easily and quickly convertible from a hit-or-miss action to a positive or regular action and vice versa, without removing any of the parts or in any way changing the structure of the engine. In other words, I have sought to provide means actuated by the speed-regulating device, such as a centrifugally operated governor, for opening one of the valves, as the exhaust valve, and holding it open when the engine reaches or exceeds a predetermined speed limit, thereby establishing communication between the firing chamber and atmosphere through the exhaust and preventing the influx and compression of the explosive mixture until the speed of the engine has dropped below such predetermined degree when the valve automatically closes at the proper time to be regularly opened and closed by suitable mechanism until the speed of the engine again exceeds such limit, whereupon the opening of the valve is repeated, thus establishing what is commonly known as a hit-or-miss action.

A further object is to control the speed of the engine by means of a throttle valve in the connection between the carbureter and inlet port and suitable connections between the valve and a centrifugally operated member on one of the revolving parts of the engine whereby the valve will be automatically and gradually closed as the speed of the engine increases or gradually opened as the speed is reduced.

Other objects and uses will be brought out in the following description.

In the drawings—Figure 1 is a vertical sectional view of my improved engine case showing the various mechanisms forming the subject matter of my present invention. Figs. 2 and 3 are horizontal sectional views through the same engine taken respectively in the planes of lines 2—2 and 3—3, Fig. 1. Figs. 4, 5 and 6 are vertical sectional views taken respectively in the planes of lines 4—4, 5—5 and 6—6, Fig. 1. Fig. 7 is an enlarged vertical sectional view through the cam shaft and parts mounted thereon and also through the adjacent portions of the engine base and roller bearings for the valve-operating devices. Fig. 8 is a detail sectional view of a portion of the speed-governing devices taken on line 8—8, Fig. 1. Fig. 9 is an enlarged detail vertical sectional view of a portion of the same governing device taken in the plane of line 9—9, Fig. 8. Fig. 10 is a transverse vertical sectional view of a portion of the same governing device taken in the plane of line 10—10, Fig. 9. Fig. 11 is a top plan of the detached carbureter and adjacent portion of the pipe leading to the fuel inlet port, showing a part of the means for operating the throttle valve in said pipe. Fig. 12 is an enlarged vertical sectional view through the left hand end of the rock shaft and lever shown in Fig. 1 for operating the throttle valve.

As illustrated, this engine comprises an upright cylinder —1— mounted upon and secured to a suitable crank case —2—, which, in this instance, is composed of a hollow base section —3— and a top section —4— meeting in approximately a horizontal plane of the axis of a crank shaft —5— and firmly secured at their junctions by suitable clamping bolts, thereby permitting the sections to be cast at separate units and allowing the crank shaft with various parts carried thereby to be placed in operative position or removed by simply separating the sections at the line of advance.

The cylinder —1— is provided with a central cylindrical bore —6— for receiving a piston —7— which is connected by a pitman —8— to the crank arms —9— of the crank shaft —5— as shown more clearly in Fig. 1, the bore of the cylinder being in constant communication at its lower end with the interior of the crank case through an opening —10— in the upper side thereof.

The upper end of the cylinder proper is closed by a suitable head —11— forming a combustion chamber —12— in constant communication with the upper end of the bore of the cylinder and, in this instance, is provided with a central screw plug —13— and similar diametrically opposite plugs —14— to permit access to the combustion chamber for cleaning the head of the piston and the inlet exhaust valves presently described and also permitting the cleansing of the terminal of a spark plug —15— which is secured in one side of the cylinder as shown in Fig. 1. The upper end of the cylinder is also provided with diametrically opposite ports —16— and —17— leading to the combustion chamber —12— and serving respectively as an inlet port for the fuel and an exhaust port for the spent gases, communication between said ports and the firing chamber being controlled by similar puppet valves —18— and —19—. The inner end of the ports —16— and —17— preferably terminate in vertical sockets or chambers for receiving separate valve cages —20— and —21—, the lower ends of which are threaded and screwed into the bases of the sockets, the upper ends of the cages being provided with valve seats for the valves —18— and —19— respectively. The lower ends of the valve cages are provided with annular grooves for receiving metal packing rings —22— similar to those commonly employed on pistons for preventing leakage of gases.

The valves —18— and —19— are provided with pendant stems —25— and —26— extending through glands in the bases of the respective valve cages —20— and —21— and through vertically alined glands in the adjacent sides of the cylinder and upper portion of the crank case so as to be wholly concealed, said valves being self-closing by retracting springs —27— which are coiled around their respective stems in reduced portions of the sockets with their upper ends bearing against the upper sides of the cages —20— and —21— and their lower ends engaged with pins or shoulders —28— on the valve stems.

*Valve-operating means.*—A tubular cam shaft —28— is journaled in a horizontal position in opposite sides of the crank case parallel with the crank shaft —5— but in a plane some distance below the same and is driven by said crank shaft through the medium of gears —30— so proportioned as to drive the cam shaft at half the speed of the crank shaft, said cam shaft being provided with a pair of cams —31— and —32— rigid thereon for opening their respective valves —18— and —19— at the proper time through the medium of separate rock arms —33— and —34— carrying rollers —35— and —36— against which the corresponding cams ride. These rock arms —33— and —34— extend transversely of and in a plane just above the crank shaft within the crank case and are fulcrumed for independent movement upon a pivotal stud or spindle —37— in close proximity to the inner sides of said crank case so as to rock vertically.

The rollers —35— and —36— are mounted directly upon branch arms —39— and —40— which are pivoted to their respective rock arms —33— and —34— and are adjustable relatively thereto by means of adjusting screws —41— and —42— for placing the arms —33— and —34— in proper relation to their respective cams —31— and —32— to impart the desired movement to the valves —18— and —19—.

The branch arms —39— and —40— are yieldingly held against the adjusting screws —41— by springs —43— and —44—, the object of which is to permit the adjustment referred to and at the same time to hold the rollers in their adjusted relation to the cams.

The lower ends of the valve stems —25— and —26— extend into the crank case in vertical alinement with their respective rock arms —33— and —34— and their lower ends are threaded and engaged by internally threaded sleeves —44— and —45— which in turn engage or rest upon the upper faces of the corresponding rock arms —33— and —34—, this adjustment serving to establish and maintain proper relation between the respective cams and also between said rock arms and valve stems to produce the desired action of the valves, said sleeves being held in their adjusted positions by jam nuts —46— and —47— shown in Figs. 4 and 5.

The operating mechanisms for the valves are adjusted and timed to open and close them at regular intervals relatively to the movements of the piston, which latter is shown in Fig. 1 at the limit of its inward stroke just about to begin its outward movement for taking in a charge of the explosive mixture at which time the cam —31— will be in the position shown in Fig. 5 as just about to open the fuel inlet valve and to hold it open during the outward stroke of the piston, thus drawing in a charge of the explosive mixture into the firing chamber —12—, the exhaust valve having just been closed and remaining closed during this outward stroke of the piston and also during the return inward stroke when the charge is compressed, it being understood that the cam —31— will have allowed the fuel inlet valve to close as soon as the piston reaches the limit of its outward stroke after taking in such charge.

As soon as the piston reaches the limit of its return or compression stroke, the compressed charge is ignited, thereby driving the piston outwardly during which time, the fuel inlet valve remains closed, but as soon as the piston reaches the limit of its firing stroke, the exhaust valve will be opened so as to permit the expulsion of the spent gases through the exhaust port when the piston returns inwardly on the fourth stroke or at the end of the second cycle, whereupon the exhaust valve will be again inclosed and together with the inlet and piston will be in the position shown in Fig. 1.

*Fuel supply.*—The force feed means for supplying liquid fuel to the carbureter forms the subject-matter of my pending application, Serial No. 830,610, filed Apr. 9, 1914.

The fuel inlet port —16— is connected by a pipe —16'— to a carbureter —48— in which a predetermined quantity of liquid fuel, as gasolene, is maintained through a supply pipe —49— and overflow pipe —50—, the supply pipe —49— being connected to a pump —51— which in turn is connected by a branch pipe —52— to a fuel reservoir —53— in the base of the crank case as shown more clearly in Figs. 1 and 4.

The fuel is drawn from the reservoir —53— and forced through the supply pipe —49— into the carbureter by means of a reciprocating piston —54— having suitable connections with an eccentric —55— on the adjacent end of the cam shaft —28—; the eccentric being adjusted and timed so as to cause one cycle of movement of the piston while the fuel inlet valve —18— is closed.

The pump case —51— is provided with check valves —56— and —57—, the check valve —56 serving to admit fuel from the reservoir —53— to the pump on the upstroke of the piston —54— and to check the return of the fuel from the pump to the reservoir on the downstroke of said piston while the check valve —57— controls communication between the pump cylinder and supply pipe —49— for admitting fuel from the pump into the supply pipe on the downstroke of the piston and preventing the back flow of the fuel from the supply pipe to the pump cylinder as shown more clearly in Fig. 1.

*Automatic speed governing mechanism.*—Within the pipe —16'— leading from the carbureter to the inlet port —16— is a throttle valve —59— shown by dotted lines in Fig. 1 for controlling the amount of fuel admitted to the firing chamber, said throttle valve being provided with an external crank arm —60— which is connected by a link —61— to the upper end of a lever or rock arm —62—, the latter having its lower end secured by a set screw —63— to the corresponding end of a rock shaft —64— which is journaled in suitable bearings in opposite sides of the upper portion of the crank case parallel with and in a plane some distance above the crank shaft —5—.

The opposite end of the rock shaft —64— at the outside of its bearing in the adjacent crank case is angular (as square) in cross section and upon this angular portion is fitted a hub —65— carrying a pendant arm —66—, the lower end of which is disposed in the path of movement of a centrifugally operated speed-governing member —69—, the latter being pivoted at —70— to one of the spokes of a balance wheel —71— on the adjacent end of the crank shaft —5—.

The free end of the speed governing member —69— is connected by a spring —72— to an anchor bolt —73— which is adjustably secured to a stud —74— on another one of the spokes, preferably diametrically opposite the pivot —70—, the spring —72— serving to permit outward centrifugal throw of the weighted member —69— to engage and operate the pendant arm —66— when the action of the engine reaches or exceeds a predetermined speed, thereby regulating the shaft —64— and lever —62— to impart a corresponding movement to the throttle valve —59—, these graduations being made so as to gradually close the throttle valve as the speed of the engine increases and to allow said valve to gradually open as the speed of the engine is diminished, the weight of the arm —66— being usually sufficient to return it and the rock shaft —64— together with the lever —62— and throttle valve —59— to their normal positions for opening the throttle valve although this return may be effected through the medium of a retracting spring if desired.

The stop pin —75— is secured to one of the spokes of the balance wheel —71— in the path of movement of the speed governing member —69— for limiting the outward throw thereof against the action of the retracting spring —72—.

The governing mechanism thus far described serves to maintain a uniform speed of the engine under regular intermittent firing at the end of each alternate inward stroke of the piston, but it will be evident from subsequent description that a portion of the same mechanism may be utilized for establishing a hit-or-miss action of the engine.

The collar —65— is provided with a radially and laterally extending arm —76— carrying one end of a bolt —77— having its other end passed through a relatively stationary bracket —78— which is spaced some distance apart from the arm —76— to permit the interposition of a coil spring —79— surrounding the adjacent portion of the bolt —77— and normally tensioned to retract the arm —66— of the speed-governing device and also serving to return the rock shaft —64—, lever —62— and throttle valve —59— connected thereto to their normal positions.

The bracket —78— is adjustable about the axis of the rock shaft —64— and for this purpose is provided with a slotted arm —78'— for receiving a clamping bolt —80— by which the bracket may be held in its adjusted position. This adjustment of the bracket —78— enables the speed-governing arm —66— to be adjusted toward and from the contact face of the centrifugally operated member —69— for effecting a partial closing of the throttle valve earlier or later in the throw of the governing member —69— according to the maximum speed at which the engine is to be regulated.

A somewhat similar adjustment may be made by adjusting the nut on one end of the bolt —77— which, when the bracket —78— is clamped against movement, serves to regulate the distance of the arm —66— from the normal position of its operating member —69—.

*Hit-or-miss action.*—In order to be able to quickly convert the engine from the regular automatic type into a hit-or-miss action, the end of the rock shaft —64— carrying the speed-governing arm —66— is journaled in a sleeve —81— which in turn is journaled in a bearing in the adjacent side of the crank case and upon which the bracket —78— is preferably mounted. The outer end of this sleeve is provided with an annular shoulder or flange —82— between which and the adjacent side of the crank case is interposed the bracket —78—, the opposite end of said sleeve being provided with a crank arm or pawl —83— keyed thereon so as to be rotated with the sleeve, the one end of said sleeve being threaded for receiving a lock nut —84— to hold the sleeve against outward endwise movement and at the same time serving to hold the pawl —83— in operative position.

A collar —85—, which is secured to the rock shaft at the inner end of the sleeve, serves, together with the collar —65—, to hold the rock shaft against axial movement.

The crank arm or pawl —83— extends downwardly through a slot —86— in the adjacent lever or rock arm —34— which serves to operate the exhaust valve —19— in the manner previously described, said pawl having its lower end provided with a hook —87— for coöperative engagement with the flange —88— on the free end of the rock arm —34— just at the outer end of the slot —86—, said pawl being provided with a spring —89— riding against the adjacent end of the slot for forcing the pawl out of interlocking engagement with said flange —88— when released.

When the engine is to be operated by regular firing impulses, the pawl —83— is rocked by hand inwardly against the inner end of the slot —86— with its hook —87— a corresponding distance away from the flange —88— or in the position shown by dotted lines in Fig. 4 so as to prevent any possibility of engagement of the hook —87— with said flange, thus allowing the valve-operating arm —34— to oscillate regularly under the action of the cam —32— and at the same time permitting said pawl to be rocked by the action of the arm —66— of the governing device when engaged by the centrifugally operated member —69— for closing the throttle valve when the engine reaches a predetermined speed limit. This hand adjustment of the pawl —83— is produced by rocking the sleeve —81— by means of a handle —89—, the sleeve being held in its adjusted position by a set screw —90— in the bracket —78—.

When it is desired to convert the engine from a regular automatic type to a hit-or-miss type, it is simply necessary to loosen the set screw —90— and then to rock the sleeve —81— by means of its hand piece —89— until the free end of the pawl —83— is brought closely to the outer end of the slot —86— where it may engage the flange —88— in a manner hereinafter described for holding the rock arm —34— in its elevated position and thereby holding the exhaust valve open when the speed of the engine exceeds a predetermined limit after which the set screw —90— is retightened and the clamping bolt —80— loosened to allow oscillation of the bracket —78— by the head —65— of the governing arm —66—.

For example, assuming now that the bracket —78— is free to oscillate and is clamped to the sleeve —81—, then the engine will be driven regularly until it reaches a predetermined speed at which time, the weighted member —69— will be operated centrifugally against and rock the arm —66—, thus imparting a similar rocking movement to the sleeve —61— through the medium of the offset —76— and its spring connection, during which operation the arm —33— for operating the exhaust valve will be raised and lowered by its cam —32— and when its free end is raised above the hook-shaped extremity —87— of the pawl —83—, the hook will be forced under the flange —88— by the pressure of the centrifugally operated member —69— against the rock arm —66— and as long as the speed of the engine is sufficient to keep the pawl —83— in position to hold the free end of the arm —34— in its uppermost position, the exhaust valve will be held open, thus permitting the engine to "breathe" freely through the exhaust to the atmosphere.

By holding the exhaust valve open in the manner just described, the suction in the firing chamber produced by the outward stroke of the piston is insufficient to draw in a fresh charge of the explosive mixture and it also follows that the compression in said chamber by the instroke of the piston is reduced to a minimum, thereby preventing the compression of any slight amount of mixture which may be drawn into said chamber, all of which tends to reduce the speed of the engine until it is below a predetermined degree necessary to operate the governing arm —66— at which time the spring —89— will have forced the pawl —83— from holding engagement with the flange —88— and allow the arm —34— to be oscillated regularly by its cam —32—.

The action above described is repeated as often as the speed of the engine exceeds the predetermined limit referred to or rather as often as the arm —66— is rocked from its normal position by the centrifugal action of the weighted member —69—.

*Ignition.*—Any suitable means may be employed for igniting and timing the ignition of the explosive mixture in the firing chamber, but for convenience of illustration, I have shown a cam shaft —28— as provided with a commutator —93— consisting of a fiber collar secured to the shaft and carrying a conductor segment —94— in electrical connection with the frame of the engine at its bearings, said frame being also in electrical connection with one of the terminals of the spark plug —15—.

A spring contact brush —95— is mounted upon a stationary insulating block —96— on the adjacent side of the crank case near the commutator for electrical contact with the segment —94— at each revolution of the cam shaft, said brush being electrically connected to one pole of a battery —D— shown in Fig. 4, the other pole of said battery being connected by wire —98— to the other terminal of the spark plug.

It is evident, of course, that any suitable form of spark coil may be used in connection with the ignition circuit if desired.

The batteries —D— are preferably mounted in a suitable chamber —99— forming an integral part of the crank case.

*Lubricating system.*—The force feed lubricating system heretofore described forms the subject-matter of my pending application, Serial No. 830,610, filed Apr. 9, 1914.

The base of the crank case is also provided with an oil-containing chamber —A— which is separated from the underlying gasolene chamber by a horizontal partition —a— and within this oil-containing chamber and upon the partition —a— is mounted an oil pump —B— having a pair of revoluble pump gears —b— meshing with each other, one of which is driven from the cam shaft —28— by suitable gears —c— as shown more clearly in Figs. 1, 6 and 7.

The pump —B— is provided with an inlet pipe —d— and with outlet ports —e— and —f—, the outlet port —e— communicating with an annular space —g— in the upper portion of the pump case through which the cam shaft —28— passes, said shaft being provided with one or more radial openings —h— communicating with the annular space —g— so that any oil which is forced through the outlet port —e— enters the hollow shaft —28— which is provided with radial outlet ports —i— arranged to distribute oil to the cam shaft bearings in the sides of the crank case and also to the contacting surfaces between the cams and rollers for operating the arms —33— and —34—, one of the ports —i— being arranged to distribute a portion of the oil to the wrist pin of the crank shaft —5—.

It is evident from the foregoing description that under this force feed of the pump —B—, the oil may be driven not only to the several bearings specified but also to the bearings for the crank shaft in the sides of the crank case because the entire oiling system is confined within said case.

The branch outlet port —f— is connected by a pipe —f'— to an external tube —j— having a return flow passage —j'— leading back into the interior of the oil reservoir, said tube being made of glass or equivalent transparent material and supported within a case —k— so that the attendant may observe at a glance whether or not the oil is feeding through the pump and to the several bearings leading from the tubular cam shaft —28—.

By providing the base of the crank case with noncommunicating compartments for the liquid fuel lubricating oil and ignition devices, as set forth in my pending application, Serial Number 830,610 filed Apr. 9, 1914, I am able to furnish a self-contained equipment having therein all of the appurtenances necessary for the operation of the engine and at the same time I am enabled to inclose more delicate mechanisms, such for example as the valve-operating device, oil pump and controlling pawl by which the engine may be changed from a regular automatic action to a hit-or-miss action and vice versa without displacing any of the parts.

Another feature of advantage is that the head of the cylinder is capped by a water-cooling chamber —100— forming an integral part of the engine case and communicating with chambers —101— which extend downwardly along the sides of the cylinder for protecting said cylinder and valves against excessive heat, the water reservoir —100— being provided with a removable head —102— which is held in place by bolts —103— and is provided with a removable cap —104— for filling purposes.

The crank case including the oil reservoir —A— and also the battery chamber —99— are provided with hand holes normally covered by plates —105— secured to the adjacent sides of the crank case to form hermetically sealed joints and at the same time permitting access to the corresponding reservoirs when necessary.

The gasolene reservoir —53— is provided with a filling inlet passage —107— normally closed by a screw cap —108—.

What I claim is:

1. In an internal combustion engine having a cylinder, a piston, a crank shaft actuated by the piston, a cam shaft actuated by the crank shaft, a fuel inlet valve and exhaust valve both actuated by the cam shaft, a throttle valve, a centrifugally operated member and means actuated thereby for operating the throttle valve to govern the speed of the engine, and means coöperating with the actuating means for the exhaust valve and actuated by the speed governing mechanism for holding the exhaust valve open when the speed of the engine exceeds a certain limit.

2. In combination with a crank shaft of an internal combustion engine having a fuel inlet port and an exhaust port, separate valves controlling such ports, a speed governing mechanism comprising a throttle valve controlling the passage of fuel to the inlet port, a centrifugally operated member actuated by the crank shaft, and means actuated by said member for operating the throttle valve.

3. In a four cycle internal combustion engine, a cylinder having an inlet port and an exhaust port, a piston, a crank shaft actuated by the piston, self-closing valves for said ports, means actuated by the crank shaft for opening said valves at regular intervals and speed governing means comprising a throttle valve controlling the passage of fuel to the inlet port, a centrifugally operated member actuated by the crank shaft, a rock shaft having a crank arm engaged by the centrifugally operated member for rocking said shaft when the speed of the engine reaches a certain limit, a lever on the rock shaft, and means for transmitting motion from the lever to the throttle valve.

4. In an internal combustion engine, a cylinder having an inlet port and an exhaust port, a piston movable in the cylinder, self-closing valves for said ports, a crank shaft actuated by the piston, a cam shaft actuated by the crank shaft, separate rock arms actuated by the crank shaft for opening said valves, a detent movable into and out of holding engagement with the rock arm which actuates the exhaust valve, a centrifugally operated member driven by the crank shaft, and means actuated by said member for forcing the detent into holding engagement with said rock arm to hold the exhaust valve open when the speed of the engine reaches a certain limit.

In witness whereof I have hereunto set my hand this 2nd day of April 1914.

ROBERT J. BALZ.

Witnesses:
H. E. CHASE,
EVA E. GREENLEAF.